W. L. BUBB & O. W. EPPERSON.
THROTTLE CONTROLLED NEEDLE VALVE OF CARBURETERS.
APPLICATION FILED JAN. 23, 1918.
1,289,105. Patented Dec. 31, 1918.
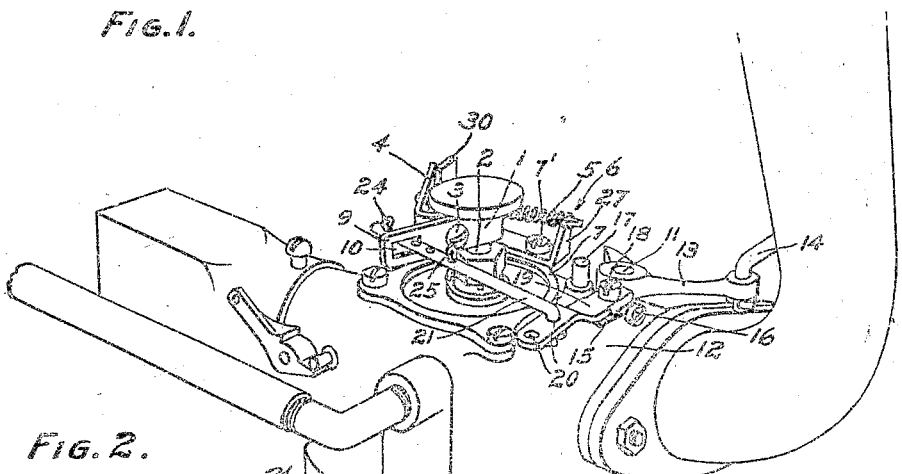
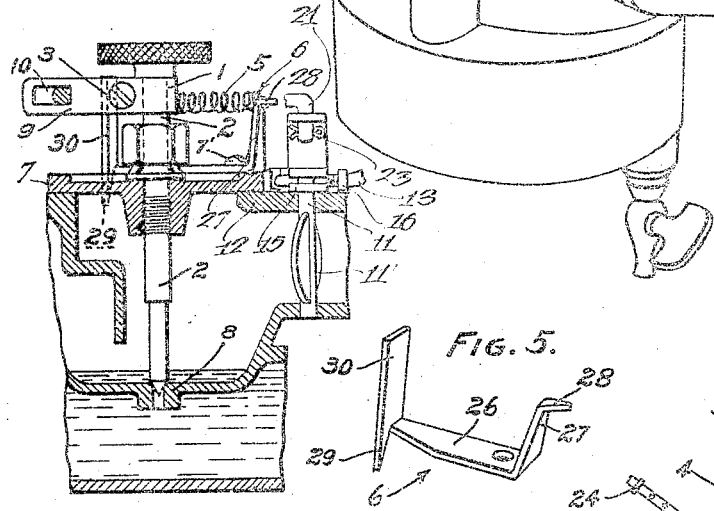
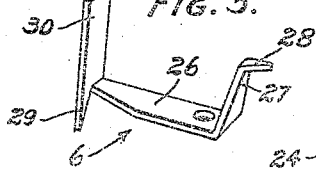
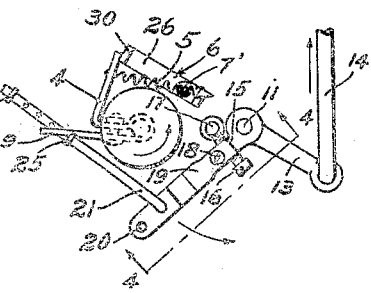
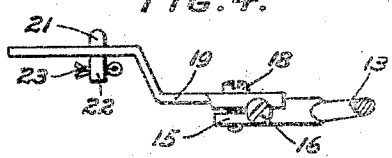
INVENTORS
WILLIAM L. BUBB
OSCAR W. EPPERSON
BY Hazard & Miller
ATT'YS

UNITED STATES PATENT OFFICE.

WILLIAM L. BURR AND OSCAR W. EPPERSON, OF LOS ANGELES, CALIFORNIA.

THROTTLE-CONTROLLED NEEDLE-VALVE OF CARBURETERS.

1,289,105.  Specification of Letters Patent.  Patented Dec. 31, 1918.

Application filed January 23, 1918. Serial No. 213,325.

*To all whom it may concern:*

Be it known that we, WILLIAM L. BURR and OSCAR W. EPPERSON, citizens of the United States, residing at Los Angeles, in the county of Los Angeles and State of California, have invented new and useful Improvements in Throttle-Controlled Needle-Valves of Carbureters, of which the following is a specification.

Our object is to provide a connection between the throttle valve and the needle valve stem of a carbureter so that the stem will be operated simultaneously with the operation of the throttle valve.

Our invention may be applied as an attachment to carbureters as now made, or carbureters may be made involving our invention.

Figure 1 is a fragmentary perspective view showing a carbureter attached to a manifold, the carbureter being provided with our invention.

Fig. 2 is a fragmentary vertical sectional detail showing the mounting of the needle valve stem.

Fig. 3 is a top plan view showing the needle valve stem and the connection between the needle valve stem and the pintle of the throttle valve.

Fig. 4 is an enlarged fragmentary side elevation looking in the direction indicated by the arrows on the line 4—4 of Fig. 3.

Fig. 5 is a perspective view of the spring supporting bracket.

A piece of spring metal strap is bent at its center to form a split bearing 1 adapted to encircle a bare portion of the needle valve stem 2 and a bolt 3 is inserted through the ends of the bearing to clamp the bearing 1 upon the stem 2. An arm 4 extends from one end of the bearing 1, a retractile coil spring 5 is connected to the arm 4, and a spring supporting bracket 6 is connected to the other end of the spring, said bracket being secured to the carbureter 7 by removing the screw 7' and reinserting the screw through the bracket, the spring 5 being exerted to rotate the stem 2 and screw it down upon its seat 8. An arm 9 extends from the other end of the bearing 1 and has a rectangular opening 10 near its outer end.

The throttle valve pintle 11 extends upwardly through the carbureter case 12 and a bell crank lever 13 is fixed upon this pintle above the case. A draw rod 14 is connected to the outer end of the lever 13 and in turn is connected to the throttle control mechanism on the steering post (not shown). An arm 15 extends from the hub of the bell crank lever 13 substantially at right angles and forms a split bearing in which an adjusting screw 16 is mounted, the point of the screw being adapted to engage a stop 17 extending upwardly from the case 12. The split bearing is operated by a screw 18 to grip the screw 16 and hold it in its adjusted position.

We remove the screw 18 and place an extension arm 19 upon the arm 15 and we insert the screw 18 through the arm 19 into the arm 15. Two or more perforations 20 are formed in the outer end of the extension arm 19. A wire link 21 has a downwardly turned end 22 inserted through one of the openings 20, and a cotter pin 23 is inserted through the end 22 below the arm 19 to hold the link in place. The opposite end of the link 21 has a series of openings through one of which a cotter stop pin 24 is inserted, the length of the link 21 being adjusted by moving the cotter pin from hole to hole. A cotter stop pin 25 is inserted through another one of the holes in the link 21 near its center to form a stop upon the opposite side of the arm 9 from the pin 24, there being considerable distance between the stop 25 and the stop 24 so as to provide lost motion between the swinging of the extension arm 19 and the swinging of the arm 9.

The spring supporting bracket 6 comprises the flat central plate 26 through which the screw 7' is inserted, the post 27 extending upwardly from one end of the plate 26 and having a hook 28 to which the spring 5 is attached, the brace 29 cut from the plate 26 and turned downwardly to engage the carbureter 7, and the needle valve stop 30 extending upwardly to limit the swing of the arm 4.

Usually the throttle control mechanism connected to the bell crank lever 13 is set to return the throttle valve 11' to closed position when released. In other words, the normal position of the throttle valve carried by the pintle 11 is closed, and the normal position of the needle valve stem 2 is closed, that is, resting upon the seat 8. The valve stem will be adjusted so that the tension of the spring 5 will tend to return it nearly to the seat and so that the pressure of the stop 25 against the arm 9 will seat the valve and stop the flow of fuel. Then if the throttle valve mechanism is operated to throw the throttle wide open the stop pin 24 will engage the arm 9 and unseat the stem 2 and allow some liquid to flow, then releasing the throttle mechanism will allow the spring 5 to return the valve stem to a position for moderate engine work. When more fuel is required the throttle valve is opened wider thereby bringing the stop 24 into engagement with the arm 9 and opening the needle. Every time that the throttle valve mechanism is operated to partly close, the needle will return to the normal feeding position by the action of the spring, and when the engine is shut down and the throttle valve returned to normal closed position, the stop 25 will operate the needle to shut off the fuel completely. The stop 25 may be adjusted to make more or less lost motion between the stop and the arm 9, and the lost motion is provided so that the valve will not be seated when the engine is in operation, the stop 25 only coming into use when it is desired to close the needle valve tight and leave the machine standing for a time.

If desired the valve stem 2 may be adjusted so that when the stop 25 engages the arm 9 and presses the arm 4 against the stop 30 there will be any desired normal flow of fuel instead of having the valve stem seat tightly and stop the flow of fuel. The stop 25 also serves as a safety device when the spring 5 becomes broken or weakened so that the spring will not operate the valve stem. In case a very good spring is used the stop 25 might be omitted.

Various changes may be made in the details of construction without departing from the spirit of our invention as claimed.

We claim:

1. The combination with a carbureter having an adjustable needle valve stem and a throttle valve swinging on an axis parallel with the needle valve stem, of a bell-crank lever fixed to the stem of the throttle valve; an extension arm extending from the bell-crank lever; a bearing clamped upon the needle valve stem; two arms extending from the bearing; an adjustable link connecting the extension arm to one of the bearing arms; and a spring connecting the other bearing arm to the frame.

2. The combination with a carbureter having an adjustable needle valve stem and a throttle valve swinging on an axis parallel with the needle valve stem and having a pintle, of a bell-crank lever fixed to the pintle; an extension arm extending from the bell-crank lever; a bearing clamped upon the needle valve stem; an arm extending from the bearing and having an opening; a link connected to the extension arm and sliding through the opening; adjustable stops upon the link one on each side of the arm; a second arm extending from the bearing; a spring connecting the second arm to a rigid part; and a stop in position to be engaged by the second arm.

In testimony whereof we have signed our names to this specification.

W. L. BUBB.
OSCAR W. EPPERSON.